United States Patent
Ackermann et al.

[15] 3,692,876
[45] Sept. 19, 1972

[54] STABILIZED FORMALDEHYDE POLYMERS

[72] Inventors: Jacob Ackermann, Gorla Minore; Pierino Radici, Turate; Franco Ferre, Gorla Minore, all of Italy

[73] Assignee: Societa Italiana Resine S.D.R. S.P.A., Milan, Italy

[22] Filed: Feb. 24, 1971

[21] Appl. No.: 118,492

Related U.S. Application Data

[63] Continuation-in-part of Ser. No. 807,925, March 17, 1969, abandoned.

[30] Foreign Application Priority Data

April 11, 1968 Italy.....................15088 A/68
Sept. 14, 1968 Italy.....................21237 A/68

[52] U.S. Cl..............260/895, 252/405, 260/45.8 N, 260/88.3 R

[51] Int. Cl........................C08g 37/04, C08g 51/60

[58] Field of Search.........................260/895

[56] References Cited

UNITED STATES PATENTS 3,632,686  1/1972  Ackermann et al........260/895
3,219,727  11/1965  Kray et al..................260/895

*Primary Examiner*—Samuel H. Blech
*Attorney*—Sughrue, Rothwell, Mion, Zinn & Macpeak

[57] ABSTRACT

Formaldehyde polymers and copolymers are stabilized by incorporating 0.05 to 10 percent by weight of a complex obtained in the form of a precipitate by contacting, in a solvent or solvent mixture, an antioxidant of the phenolic type which has an acidic character and polyvinyl pyrrolidone. A composition of matter comprising said formaldehyde and said stabilizer is also claimed.

16 Claims, No Drawings

STABILIZED FORMALDEHYDE POLYMERS

CROSS-REFERENCE TO RELATED APPLICATIONS

This application is a continuation-in-part of U.S. Ser.No. 807,925, filed Mar. 17, 1969, now abandoned and claims the priority of Italian patent 832,196 and Italian patent application, Ser.No. 21237-A/68, filed Sept. 14, 1968.

FIELD OF THE INVENTION

This invention relates to formaldehyde polymers which are stabilized against degradation by heat and light. It relates particularly to compositions containing such polymers together with small amounts of certain complex stabilizers.

BACKGROUND OF THE INVENTION

By "formaldehyde polymers," we refer to high molecular weight polymers or copolymers of formaldehyde wherein (i) the terminal hydroxyl groups have been converted to urethane, ether, or, especially, ester groups to improve the heat stability of the compound; and (ii) substituted formaldehyde polymers, that is, containing in the chain one or more groups of the formula:

$$+R_1CR_2+_n$$

wherein $R_1$ and $R_2$ are the same or different radicals of various kinds and $n$ is an integer of at least 2, and in which the unstable fraction has been eliminated by controlled degradation. The substituted polymers (ii) are more stable than the unsubstituted class (i), but they are still not satisfactorily stable.

The polymers and copolymers of formaldehyde are of a molecular weight of 10,000 to 200,000, preferably 15,000 to 100,000.

The formaldehyde polymers or copolymers having their terminal groups stabilized by estereous, ethereous and urethane groups are of the following structure, respectively:

.....$(CH_2O)_n — CH_2 — O — CO — R$
.....$(CH_2O)_n — CH_2 — O — R$
.....$(CH_2O)_n — CH_2 — O — CO — NHR$ wherein R normally is an alkyl radical, typically methyl.

The copolymers of formaldehyde which contain in the macromolecular chain the groups are:

wherein $n$ varies from 2 to 6, and $R_1$, $R_2$ may be hydrogen, halogen, oxygen, an alkyl group having one to six carbon atoms, a mononuclear aryl radical, a cycloaliphatic radical (e.g. cyclohexyl and cyclopentyl), or combinations thereof. The best known formaldehyde copolymers are copolymers of formaldehyde and ethylene oxide, dioxolane or cyclic ethers generally.

In the formulation of formaldehyde copolymers described macromolecules of the following general type are obtained:

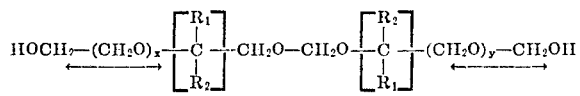

These macromolecules are heated under conditions such as to remove (in the form of gaseous formaldehyde) the chain fractions at the ends (marked in the formula) up to the first monomer other than formaldehyde.

Formaldehyde polymers, though improved in stability by the above-mentioned treatments, still lack satisfactory properties for the uses for which they are normally employed, so that special additives were resorted to.

For this purpose the art employed antioxidants of the phenolic type and slightly basic organic compounds containing nitrogen, capable of absorbing formaldehyde or oxidation products of formaldehyde or of the polymer.

It is further known in the art that by using a phenolic compound together with a nitrogen-containing compound, such as a polyamide, stabilizing effects on formaldehyde polymers are obtained, which are superior to those obtainable with a comparable quantity of either of the compounds belonging to the above-mentioned classes.

However, it is known that formaldehyde polymers thus stabilized still suffer from certain drawbacks which could not be removed by known stabilizing methods.

For instance, stabilizers incorporated by the polymer are extractable in part at least by contact with common organic solvents or water.

This results not only in loss of the stabilizing effect, but the solubilized products may represent undesirable impurities, especially when formaldehyde polymers are utilized for manufacturing containers for foodstuff or pharmaceuticals, wherein the "release tests" are imperative.

A further drawback resides in the fact that the cited stabilizers often impart a more or less intense coloring to formaldehyde polymers.

This coloring is believed to be due in part at least to the presence of certain impurities, hardly removable, contained in the stabilizers.

The method of the present invention is based on a novel manner of using stabilizers known in the art and yields formaldehyde polymers of high stability, free from the above described drawbacks.

SUMMARY OF THE INVENTION

The present invention provides a method for stabilizing formaldehyde polymers and copolymers by incorporating in said polymers or copolymers a complex produced by dissolving a polyvinyl pyrrolidone having a molecular weight of 1,100 to 90,000 and a phenolic antioxidant in a common solvent or solvent mixture, and precipitating the complex compound of the polyvinyl pyrrolidone and the phenolic antioxidant by adding to the resulting solution a nonsolvent for the complex compound. The complex compound is separated from the parent liquid subsequent to precipitation thereof so that the complex compound is substantially free of unreacted polyvinyl pyrrolidone and phenolic anti-oxidant.

A composition of matter comprises a formaldehyde polymer or copolymer as described and from 0.05 to 10% by weight of said complex compound.

It is thus one object of the present invention to provide a novel manner of using stabilizers which yields formaldehyde polymers or copolymers of high stability, free from the drawbacks of the prior art as heretofore described.

It is a further object of the present invention to provide a novel composition of matter which is a formaldehyde polymer of high stability, also free from the heretofore described defects of the prior art, the novel composition of matter comprising said formaldehyde polymer (or copolymer) and the complex compound described.

These and other objects of the present invention will become clearer from a reading of the following material.

DETAILED DESCRIPTION OF THE PREFERRED EMBODIMENTS OF THE INVENTION

More particularly, the method of the invention stabilizes formaldehyde polymers by incorporating therein complex products which are obtained in the form of precipitates by contacting in a solvent or a solvent mixture an antioxidant compound of the phenolic type of acidic character and polyvinyl pyrrolidone.

Phenolic antioxidant compounds of acidic character particularly useful for the purpose of the invention are those normally known in the art, such as: 2,5-di-tert-amyl-hydroquinone; 2,5-diisopropylhydroquinone; 2,2'-methylene-bis(4-methyl-6-tert-butylphenol); 4,4'-butylidene-bis(6-tert-butyl-3-methylphenol); 4,4-isopropylidene-bis-phenol; 4,4-thio-bis(6-tert-butyl-3-methylphenol); 1,3,5-trimethyl-2,4,6-trimethylene(3,5-di-tert-butyl-4-hydroxyphenyl)-benzene; n-octadecyl-beta (4'-hydroxy-3',5'-di-tert-butylphenyl)-propionate, and the condensation product of crotonaldehyde with 3-methyl-6-tert-butylphenol.

The phenolic antioxidants may be represented by the following formulae:

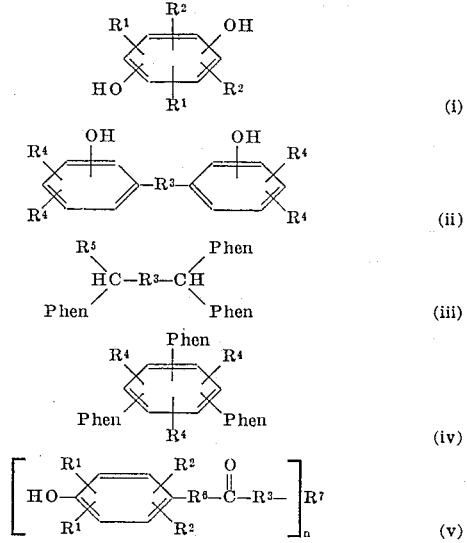

wherein:

each $R^1$ is an alkyl group of one to four carbon atoms, each $R^2$ is selected from the group consisting of hydrogen and alkyl radicals of one to four carbon atoms, $R^3$ is selected from the group consisting of oxygen, sulphur and aliphatic radicals of one to four carbon atoms, each $R^4$ is selected from the group consisting of hydrogen and aliphatic radicals of one to 18 carbon atoms, $R^5$ is as defined for $R^4$ or Phen, each Phen is a phenol radical bearing two $R^4$ groups, as defined above, $R^6$ is an alkylene radical of one to four carbon atoms, $R^7$ is selected from the group consisting of aliphatic radicals of one to 30 carbon atoms and aliphatic radicals of one to 30 carbon atoms bearing 1 to 10 hydroxyl groups, $R^8$ is the group —O— or —NH—, and $n$ is an integer from 1 to 4.

The polyvinyl pyrrolidone should be of a molecular weight above about 1,100 up to about 90,000.

According to the method of the invention, polyvinyl pyrrolidone and the phenolic antioxidant are dissolved in a common solvent, the complex compound being precipitated by adding to the solution a nonsolvent for the complex.

The term "common solvent" means solvents which fully dissolve PVP and the phenol antioxidant. Such solvents are alcohols or alcohol-ketone mixtures with the ketone content equaling, or lower than, 60 percent by volume. Preferred solvents for the purpose are methanol and mixtures thereof with acetone. Any common solvent can be used which does not interfere with complex formation.

Further useful solvents are dialkyl formamides (such as dimethylformamide and diethylformamide) and dialkyl acetamides (such as dimethylacetamide and diethylacetamide).

The preferred nonsolvent is water. Further nonsolvents are liquid aliphatic hydrocarbons (such as hexane and heptane) and liquid mononuclear aromatic hydrocarbons (such as benzene and toluene). Generally, addition of the nonsolvent precipitates the complex in powder form.

Preparation of the solution can be carried out at room temperature or even higher temperature in order to promote dissolution of the starting compounds, whereas the complex is usually precipitated at room temperature.

The dissolution temperature is normally 20° to 80° C, preferably 20° to 60° C. The precipitation temperature is normally from 20° to 60° C, preferably 20° to 40° C.

By operating under these conditions, the non-reacted polyvinyl pyrrolidone and/or phenolic antioxidant remain in the solution together with any impurities, a complex compound being precipitated of the general formula $(A)(B)_n$ wherein A stands for the phenolic antioxidant, B for polyvinyl pyrrolidone, and $n$ is from 0.5 to 2.0.

The relative quantities of phenolic antioxidant and PVP on dissolution are maintained as near as possible to those present in the complex compound which is precipitated (in order to avoid losses of either reagent).

Most preferably, a solution is prepared which contains 1 to 15 g PVP and phenolic antioxidant to 100 ml solvent. The non-solvent is then added in a quantity of 1 to 20 parts by volume to one part by volume of the solvent.

It will be noted from the examples that it is moreover possible to dissolve a reagent in the solvent (for the reagents) and the other reagent in the nonsolvent (for the complex). Such an embodiment is also included within the invention.

These complex compounds confer high stability to formaldehyde polymers when incorporated in said polymers in a quantity of 0.05 to 10 percent preferably 0.1 to 2 percent by weight.

In the preferred embodiment of the method of the invention, the stabilizing complex compound is precipitated in the presence of the formaldehyde polymer to thereby obtain a stabilizer-rich master batch.

In the formation of the stabilizer-rich formaldehyde polymer, ratios of formaldehyde polymer to stabilizers of 1/1 to 10/1, typically 4/1, are maintained.

This master batch is then homogenized with a further quantity of formaldehyde polymer so as to lower the percentage of the stabilizer to the above-defined range.

According to a further embodiment, precipitation is effected in the absence of the formaldehyde polymer, the precipitated complex being then incorporated in the polymer in the usual manner. Usually the stabilizer is incorporated in a polymer (in addition to the manner described) simply by mixing solids, or the components are mixed in a melted state or dissolved in the solvent.

In any case, the precipitated complex should advantageously be repeatedly washed with water or organic liquids which are nonsolvent or slightly solvent (the stabilizer is removed in a negligible quantity) towards the complex, such as for instance, toluene, heptane or mixtures thereof, and thereupon finally dried. Drying is normally carried out at temperatures from 60° to 120° C, preferably 80° to 100° C, during periods of 20 to 60 minutes, in an inert medium or in vacuum.

In this manner, traces of polyvinyl pyrrolidone and/or phenolic antioxidant in a free form are eliminated from the complex. By proceeding according to the invention, stable formaldehyde polymers are obtained, from which the stabilizers will hardly be extracted by the action of water or organic solvents.

As will be evident from the following experimental examples, the complex compounds of the invention are of lower solubility with respect to one component at least and, generally, with respect to both components.

A further advantage of the invention resides in the fact that the stabilized formaldehyde polymers exhibit a lower tendency towards undesirable coloring.

As mentioned above, this is believed to be due to the absence of impurities present in polyvinyl pyrrolidone or phenolic antioxidant, which are removed on precipitation of the stabilizer complex.

Under the conditions of this invention, the quantity of free PVP or free antioxidant varies from negligible values to about 1 percent by weight of the complex depending upon washing thoroughness.

The major impurities removed are organic or inorganic salts which are normally utilized in he polymerization of vinyl-pyrrolidone to PVP.

Moreover, the resulting formaldehyde polymers exhibit high stability properties probably because the process of the invention effects an optimum mutual distribution of the polyvinyl pyrrolidone and phenolic antioxidant, which are chemically bound in the same complex.

A further advantage resides in the fact that precipitation carried out in the above-described manner yields a stabilizer complex of physical properties such that it is easily homogenized with the formaldehyde polymer.

As mentioned above, it was known to employ polyvinyl pyrrolidone and phenolic antioxidants in stabilizing formaldehyde polymers, such as for instance, by U.S. Pat. No. 3,219,727. However, it was not known to use said stabilizers in accordance with the method of the invention.

Thus, for instance, in example 1 of the cited patent, polyvinyl pyrrolidone and the phenolic antioxidant are dissolved in methanol and caused to deposit on the formaldehyde polymer by evaporating the solvent.

Although with this procedure complex compounds probably still form between the polyvinyl pyrrolidone and phenolic antioxidant, the advantages of the present invention are not obtained. In fact, under the conditions of this U.S. patent, the fractions of polyvinyl pyrrolidone and phenolic antioxidant are in an unreacted form, or the impurities present in said compounds are not eliminated from the precipitate.

The method of the invention is essentially characterized by the incorporation in the formaldehyde polymer of stabilizers only in the form of a complex product obtained by precipitation and in the above defined quantities.

Under the conditions of the U.S. Patent, it is not possible to ascertain the extent of reaction of the polyvinyl pyrrolidone and phenolic antioxidant, with the consequence that the stability conferred to the formaldehyde polymer by said reaction product is unpredictable.

The following examples illustrate the invention.

PREPARATION EXAMPLE 1

A solution of 5.9 g of 4,4-isopropylidene-bisphenol and 6.0 g of polyvinyl pyrrolidone (molecular weight approximately 30,000) in 100 ml of methanol solution, was fed drop by drop into 2.5 times its volume of water in a thermostatically controlled vessel equipped with a stirrer. The temperature was maintained between 30° and 40° C.

A fine precipitate was thus obtained, which was filtered off, washed 5 times with distilled water, and dehydrated under vacuum at 60° C. 11.3 g of reaction product was obtained.

PREPARATION EXAMPLE 2

Using the apparatus of Example 1, 240 ml of an aqueous solution containing 13.3 g of polyvinyl pyrrolidone (molecular weight approximately 90,000) was fed slowly into 200 ml of a vigorously stirred solution in methanol of 14 g of 4,4-thio-bis-(6-tertiobutyl-3-methylphenol) while maintaining the temperature at approximately 30° C. When 30 ml of the aqueous solution had been added, a precipitate formed, which increased as the feed of the aqueous solution was continued.

The precipitate was filtered off, crushed and thoroughly washed with distilled water at 50°–60° C. 26.9 g of a white powder was obtained.

The solubility values (expressed in grams per 100 ml of solvent) in different solvents were measured for the reactants (A and B) and reaction products ($AB_n$) of Examples 1 and 2. The results are listed in Table I. It will be observed that the solubility of each reaction product is lower than at least that of one of the two initial reactants.

The infrared spectrum was also determined for the complex obtained according to Example 2, compared to that corresponding to the superimposition of the two initial reactants. In both cases, the substances to be analyzed were applied in a thin layer on a sodium chloride "window". By comparing the spectrum of the reaction product with that corresponding to the superimposition of the two reactants, a displacement was observed of the band relating to the associated phenol groups, between 3.00 and 3.10 $\mu$ with retention of the bands of 2.85, 9.85, 11.15 and 11.80 $\mu$ having a medium or high intensity in the spectrum of the reactants. The appearance was also observed of new bands at 3.50 and at 8.25 $\mu$ as well as a change of ratio between these bands and the doublets of the bands at 6.25/6.40 and 7.30/7.60 $\mu$.

TABLE I

| Ex. | Solvent | Temp. (°C) | Solubility A | B | AB |
|---|---|---|---|---|---|
| 1 | water | 25 | insoluble | soluble in all proportions | insoluble |
| 2 | water | 25 | insoluble | ditto | ditto |
| 1 | water | 80 | ditto | ditto | ditto |
| 2 | water | 80 | ditto | ditto | ditto |
| 1 | toluene | 25 | 0.3 | insoluble | 0.02 |
| 2 | toluene | 25 | 6 | ditto | 0.2 |
| 1 | toluene | 100 | 8 | ditto | 0.25 |
| 2 | toluene | 100 | 65 | ditto | 0.2 |
| 1 | (methanol 88% (water 12% | 25 | soluble in all proportions | soluble in all proportions | 2.0 |
| 2 | (methanol 88% (water 12% | 25 | 70 | ditto | 7 |

PREPARATION EXAMPLE 3

In the apparatus of Example 1, a complex was formed between polyvinyl pyrrolidone (molecular weight approximately 60,000) and 4,4-thio-bis-(6-tert-butyl-3-methylphenol).

At ambient temperature, 12.8 ml of a solution of polyvinyl pyrrolidone in methanol containing 6 g of polymer per 100 ml of solution, was added slowly, with stirring, to 220 ml of a solution in toluene containing 5.8 g of the phenol compound per 100 ml of solution. The gummy precipitate formed was filtered off and washed with a mixture of equal parts of toluene and heptane, until the filtrate contained no more phenol compound. There was thus obtained 1.66 g of a reaction product, insoluble in hot or cold water; after evaporation of the solvents, 11.91 g was recovered of 4,4-thio-bis-(6-tert-butyl-4-methylphenol) from the mother-liquor and wash liquid.

PREPARATION EXAMPLE 4

The reaction was conducted as in Example 3, while employing 35 ml of the solution of polyvinyl pyrrolidone instead of 12.8 ml. 4.44 g of product was obtained, insoluble in cold or hot water, and 10.46 g of phenol compound was recovered from the mother-liquors of the reaction and from the washing liquid.

PREPARATION EXAMPLE 5

The reaction was conducted as in Example 2, but with various ratios between the initial products, and their corresponding quantities in the reaction products were measured.

Employing the letter A to denote the 4,4-thio-bis-(6-tertiobutyl-3-methylphenol), B to denote polyvinyl pyrrolidone of a molecular weight of approximately 90,000, and AB to denote the reaction product, the values listed in Table II hereunder are found:

TABLE II

| Weight ratio A/B of the reactants | Weight ratio A/B in the reaction product AB |
|---|---|
| 13 :1 | 1.16:1 |
| 4 :1 | 1.11:1 |
| 1 :1 | 1.05:1 |
| 0.6:1 | 0.98:1 |

The FIGS. in this table demonstrate that the ratio between the acid ingredient and the basic ingredient is practically constant in the reaction product, despite variation in the ratios of reactants.

PREPARATION EXAMPLE 6

Using the procedure of Example 1, several further complexes were produced from different kinds (a) to (g) of acid (A) and polyvinyl pyrrolidone.

The melting ranges of the reaction products were determined and are listed in Table III.

TABLE III

| Reactants (Example 6) | melting range of the reaction product AB (in °C) |
|---|---|
| a) A 4,4-thio-bis(6-tert-butyl-3-methylphenol)<br>B polyvinyl pyrrolidone (mol.wt. 30,000) | 164–170 |
| b) A 4,4-isopropylidene-bisphenol<br>B polyvinyl pyrrolidone (mol.wt. 30,000) | 127–136 |
| c) A reaction product of 3 mols 3-methyl-6-tert-butylphenol and 1 mol crotonaldehyde<br>B polyvinyl pyrrolidone (mol.wt. 90,000) | 213–224 |
| d) A 4,4'-butylidene-bis-(6-tert-butyl-3-methylphenol)<br>B polyvinyl pyrrolidone (mol.wt. 90,000) | 151–172 |
| e) A 2,2'-methylene-bis(4-methyl-6-tert-butylphenol)<br>B polyvinyl pyrrolidone (mol.wt. 90,000) | 127–142 |
| f) A 2,4-di-tert-amyl-hydroquinone<br>B polyvinyl pyrrolidone (mol.wt. 90,000) | 156–170 |

EXAMPLE 7

Fifteen liters of a solution in methanol containing 8.4 g of 4,4-thio-bis-(6-tertiobutyl-3-methylphenol) and 8.0 g of polyvinyl pyrrolidone (having a molecular weight of approximately 90,000) per 100 ml of solution, were fed into a thermostatically controlled vessel equipped with a stirrer. The temperature was maintained between 45° and 55°C, while 3.5 kg of powdered acetylated polyformaldehyde and then 30 liters of desalinated water were slowly added. The polyformaldehyde employed in this example had a molecular weight of 35,000, and was obtained by polymerization of pure formaldehyde, in toluene and in the presence of a polymerization catalyst. The crude polymer thus obtained was then acetylated with acetic anhydride to lock the terminal groups of the macromolecules.

A fine and homogenous suspension was thus obtained, which was filtered in a centrifuge. The mother liquor after the filtration was clear, and the residue after evaporation at 110° C amounted to less than 0.02 g per 100 ml. The batch of solid precipitate was washed thoroughly in the centrifuge with hot distilled water, scraped from the centrifuge and dried in air in a drier employing a pneumatic conveyor system.

There was thus obtained 5.88 kg of a composition rich in stabilizer, in the form of a powder having a granulometry and apparent density analogous to those of the polyformaldehyde. 5 further kg of acetylated polyformaldehyde were mixed with 37 g of this composition so as to reduce the content of stabilizer to 0.7 percent, by weight of the polymer.

The composition was extruded in the form of granules of a diameter of approximately 2 mm, in a worm-type extrusion press, at a temperature of 190° – 220°C.

The following tests were performed on these granules:

a. Thermal degradation at 220°C in a nitrogen atmosphere ($K_{220}$): measured by the speed of decomposition, expressed in percentage by weight of the polymer per minute during the first 30 minutes.

b. Degradation in air at 220° C ($D_{220}$): measured by the loss in weight, expressed in percentage of the polymer, after 10 and 20 minutes of heating at 220° C. The color of the polymer after extrusion was also noted.

The results for Examples 7 to 12 are listed in Table IV.

COMPARATIVE EXAMPLE 8

Equal parts by weight of 4,4-thio-bis-(6-tert-butyl-3-methylphenol) and polyvinyl pyrrolidone of a molecular weight of 90,000 were crushed and intimately mixed together, and the mixture was added to the formaldehyde polymer of Example 7 in quantities corresponding to 0.35 percent of each by weight of polymer. The polymer containing the stabilizer was then shaped into granules and tested as in Example 7.

EXAMPLE 9

Using the procedure of Example 7, the same formaldehyde polymer was stabilized by the addition of 1 percent by weight of the product of reaction of a polyphenol (obtained by condensation of one molecule of croton aldehyde and 3 molecules of 3-methyl-6-tert-butylphenol) and of polyvinyl pyrrolidone of a molecular weight of 15,000. The composition was granulated and tested.

COMPARATIVE EXAMPLE 10

Using the procedure of Example 8, the polyphenol and the polyvinyl pyrrolidone described in Example 9 were added to the formaldehyde polymer, so as to have a total proportion of 1 percent by weight in the polymer. The composition was granulated and tested.

EXAMPLE 11

Example 7 was repeated, but using as stabilizer 0.5 percent by weight of the product of reaction of 2,2'-bis-(4-hydroxyphenyl-propane) with polyvinyl pyrrolidone of molecular weight 30,000. The composition was granulated and tested.

EXAMPLE 12

Using the procedure of Example 8, 3-methyl-6-tertiobutylphenol and polyvinyl pyrrolidone of a molecular weight of 30,000 were added to the formaldehyde polymer, so as to obtain a quantity of stabilizer corresponding to 0.5 percent by weight of the polymer.

The results of the tests on the granulated polymers of Examples 7 to 12 are summarized in Table IV.

TABLE IV

| Ex. No. | $K_{220}$ | $D_{220}$ 10 mins | $D_{220}$ 20 mins | Color |
|---|---|---|---|---|
| 7 | 0.07 | 0.4 | 1.0 | white |
| 8 | 0.12 | 0.8 | 1.5 | pink-fawn |
| 9 | 0.12 | 1.0 | 1.5 | white |
| 10 | 0.22 | 1.9 | 2.6 | grey-fawn |
| 11 | 0.09 | 0.7 | 3.6 | white |
| 12 | 0.25 | 1.7 | 7.8 | light fawn |
| 7* | — | 0.8 | 0.9 | — |

After extraction with toluene at 100°C for 24 hours.

EXAMPLE 13

Three hundred ml of a methanol solution containing 5.0 g/100 ml 2,2'-methylene-bis(4-methyl-6-tert-butylphenol) (available in the trade) and 5.0 g/ 100 ml polyvinyl pyrrolidone (molecular weight 30,000) (available in the trade) are introduced dropwise into a thermostated container equipped with an efficient stirrer, containing 750 ml water and 45 g of a polymer obtained by polymerizing trioxane in the presence of ethylene oxide and an initiator such as $BF_3$-diethyletherate. The unstable polymer portion has been removed from the raw product after polymerization by heat treatment. The polymer is of an intrinsic viscosity amounting to 1.78.

During addition of the methanol solution, the temperature of the suspension is kept at 30°–40° C, whereby the complex compound is precipitated on the polymer present. The suspension is then filtered and the solid residue is repeatedly washed with demineralized water and vacuum dried at 60° C. 50 g of said product are added to 950 g polymer identical with the previously used one.

The mixture is melted in a laboratory screw extruder at a temperature of 200°–230° C and converted to granules by means of an automatic chopper.

The polymer (POM 17) was then submitted to thermal degradation tests in nitrogen at 220° C ($K_{220}$) and in air at 220° C ($D_{220}$) as stated in Example 7. The results are given in Table V.

10 g granules were introduced into a 250 ml flask provided with a stirrer and containing 100 ml benzene. The suspension was stirred during 120 hours at a temperature of 20° C. At the end of this period the polymer was filtered, dried in a stove at 60°C in vacuum, then submitted to the thermal degradation test in air at 220° C (POM' 17). The results obtained are summarized in Table V.

The polymer was moreover submitted to a heat test in a plastometer. The granules are introduced into the apparatus at 230° C and at intervals of 5–10–20–30 minutes, the melt index expressed in g/10 min under a load of 2,160 g is determined. The color of the extruded polymer is also checked. The results (POM 17) are summarized in Table VI.

EXAMPLE 14

This example is given by way of comparison with the previous one and with No. 1 of U.S. Pat. No. 3,219,727.

Three hundred ml of a methanol solution containing 5.0 g/100 ml 2,2'-methylene-bis(4-methyl-6-tert-butylphenol) (same product as in Example 13) and 5.0 g/100 ml polyvinyl pyrrolidone (molecular weight 30,000) (same product as in Example 13) are placed into a laboratory mixer together with 45 g of a polymer obtained by the polymerization of trioxane in the presence of ethylene oxide identical with the one employed by Example 13.

The mixer is provided with double wall so that the mixture can be heated by water circulation controlled by a thermostat. The solvent is thereby removed. The stirrer is then operated and water is circulated at 70° C in the mixer jacket. After a period of about 3 hours, the solvent is totally evaporated and the polymer-additive mixture is discharged.

Fifty g of the resulting product is added to 950 g of a polymer identical with the one employed above. The mixture is melted in a laboratory screw extruder at a temperature of 200–230° C and converted to granules by means of an automatic chopper.

The polymer (POM 18) is then submitted to the same tests as the polymer in Example 13. The results are summarized in Tables V, VI, respectively.

TABLE V

| Polymer | Color | $K_{220}$ | $D_{220}$ 10 mins | 20 mins |
| --- | --- | --- | --- | --- |
| POM 17 | white | 0.06 | 0.6 | 0.8 |
| POM 18 | white-beige | 0.08 | 1.0 | 1.6 |
| POM' 17 | white | — | 0.8 | 1.4 |
| POM' 18 | white-beige | — | 1.5 | 5.0 |

TABLE VI

| Period of Test | POM 17 Melt Index | Color | POM 18 Melt Index | Color |
| --- | --- | --- | --- | --- |
| 5' | 3.5 | white | 3.5 | beige |
| 10' | 3.7 | white | 5.0 | yellow |
| 20' | 3.7 | white | 12.0 | yellow |
| 30' | 10 | light yellow | >50 | yellow-brown |

The data in Table V show that the stabilizer employed in POM 17 is more difficult to extract with solvent than the stabilizer employed in POM 18.

Moreover, Table VI shows that the decrease in molecular weight (melt index) and the tendency to yellowing during heat treatment in the plastometer are lower with the stabilizer of Example 13 as compared with the stabilizer of Example 14.

While the invention has been described with reference to certain specific embodiments thereof, it is the intention to be limited only by the scope of the following claims.

What we claim is:

1. A method of stabilizing a member selected from the group consisting of formaldehyde polymers and formaldehyde copolymers by the joint use of polyvinyl pyrrolidone and a phenolic antioxidant comprising the following steps:

dissolving a polyvinyl pyrrolidone of a molecular weight of from about 1,100 to about 90,000 and a phenolic antioxidant in a common solvent, precipitating a complex compound of the polyvinyl pyrrolidone and said phenolic antioxidant by adding to the solution a nonsolvent for said complex compound to yield said precipitated complex compound and a parent liquid, separating said complex compound from its parent liquid to obtain said compound in a condition substantially free from unreacted polyvinyl pyrrolidone and phenolic antioxidant, incorporating from 0.05 to 10 percent by weight of said complex compound in said formaldehyde polymer or copolymer, wherein said phenolic antioxidant is selected from the group consisting of:

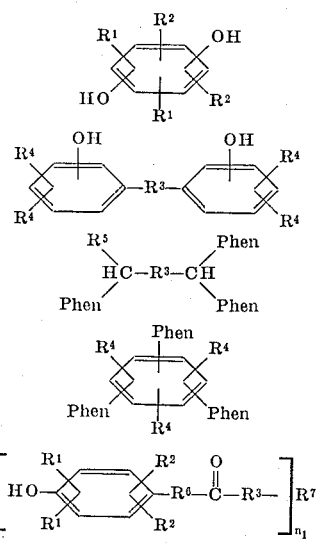

and wherein:

each $R^1$ is an alkyl group of one to four carbon atoms, each $R^2$ is selected from the group consisting of hydrogen and alkyl radicals of one to four carbon atoms, $R^3$ is selected from the group consisting of oxygen, sulphur and aliphatic radicals of one to four carbon atoms, each $R^4$ is selected from the group consisting of hydrogen and aliphatic radicals of one to 18 carbon atoms, $R^5$ is as defined for $R^4$ or Phen, each Phen is a phenol radical bearing two $R^4$ groups, as defined above, $R^6$ is an alkylene radical of one to four carbon atoms, $R^7$ is selected from the group consisting of aliphatic radicals of one to 30 carbon atoms and aliphatic radicals of one to 30 carbon atoms bearing 1 to 10 hydroxyl groups, $R^8$ is the group —O— or —NH—, and $n_1$ is an integer from 1 to 4.

2. The stabilized formaldehyde polymers and formaldehyde copolymers prepared by the method of claim 1.

3. The composition of claim 2 wherein said stabilized formaldehyde polymer has a molecular weight of from about 10,000 to about 200,000.

4. The composition of claim 2 wherein said formaldehyde polymer contains terminal groups stabilized by a member selected from the group consisting of an ester, ether or urethane group.

5. The composition of claim 2 wherein said stabilized formaldehyde polymer composition contains less than one percent by weight of said complex of free polyvinyl pyrrolidone and free phenolic compound.

6. The method of claim 1 wherein said complex has the formula $AB_n$, wherein A is said phenolic antioxidant and B is said polyvinyl pyrrolidone, further wherein n is 0.5 to 2.0.

7. The method of claim 1 wherein said member from said group consisting of formaldehyde polymers and formaldehyde copolymers has a molecular weight of from about 10,000 to about 200,000.

8. The method of claim 1 wherein said member selected from the group consisting of formaldehyde polymers and formaldehyde copolymers contains terminal groups stabilized by a member selected from the group consisting of an ester, ether or urethane group.

9. The method of claim 1 wherein said common solvent is selected from the group consisting of alcohol and alcohol/ketone mixtures, comprising no more than 60 percent by volume of said ketone.

10. The method of claim 1 wherein said nonsolvent is water.

11. The method of claim 1 wherein said dissolving is at a temperature of 20° to 80° C.

12. The method of claim 1 wherein said precipitating is at a temperature of 20° to 60° C.

13. The method of claim 1 wherein said dissolving yields a system comprising from 1 to 15 grams of polyvinyl pyrrolidone plus phenolic antioxidant per 100 ml of solvent.

14. The method of claim 1 wherein from one to 20 parts by volume of said nonsolvent are added per 1 part by volume of said solvent.

15. The method of claim 1 wherein following said separating less than 1% of unreacted polyvinyl pyrrolidone and phenolic antioxidant are present, based on the weight of said complex.

16. The method of claim 1 wherein one of said polyvinyl pyrrolidone and said phenolic antioxidant are added to the other of said polyvinyl pyrrolidone and said phenolic antioxidant in said solvent, said other of said polyvinyl pyrrolidone and said phenolic antioxidant being present in said common solvent.

* * * * *